(12) United States Patent
Fraser et al.

(10) Patent No.: US 6,229,147 B1
(45) Date of Patent: May 8, 2001

(54) DETECTOR AND METHOD FOR AUTORADIOGRAPHY

(75) Inventors: George William Fraser; John Ernest Lees, both of Leicester (GB)

(73) Assignee: University of Leicester (GB)

( * ) Notice: Subject to any disclaimer, the term of this patent is extended or adjusted under 35 U.S.C. 154(b) by 0 days.

(21) Appl. No.: 09/051,260

(22) PCT Filed: Sep. 10, 1996

(86) PCT No.: PCT/GB96/02238

§ 371 Date: Sep. 3, 1998

§ 102(e) Date: Sep. 3, 1998

(87) PCT Pub. No.: WO97/14061

PCT Pub. Date: Apr. 17, 1997

(30) Foreign Application Priority Data

Oct. 6, 1995 (GB) .................................................. 9520384

(51) Int. Cl.$^7$ .................................................. H01L 31/115
(52) U.S. Cl. ..................................... 250/393; 250/370.09
(58) Field of Search ............................... 250/393, 370.11, 250/370.09, 370.1

(56) References Cited

U.S. PATENT DOCUMENTS 5,475,225 * 12/1995 Stettner .......................... 250/370.11

* cited by examiner

*Primary Examiner*—Seungsook Ham
*Assistant Examiner*—Richard Hanig
(74) *Attorney, Agent, or Firm*—Charles D. Gunter, Jr.

(57) ABSTRACT

There is disclosed an autoradiography system which includes an autoradiography sample, a substantially radio-isotope free microchannel plate (MCP), and an MCP signal collection means, wherein the MCP directly measures beta particles from radioisotopes within the sample.

18 Claims, 12 Drawing Sheets b 1 mm

DETECTOR AND METHOD FOR AUTORADIOGRAPHY

This invention relates to the field of autoradiography.

Film autoradiography, wherein radiological grade X-ray film is used to record two dimensional spatial beta-radioactivity patterns, is a standard procedure in bio-medical research. The sample may be present as a thin tissue section or dried electrophoresis gel, such as is used in DNA 'fingerprinting' techniques. Film autoradiography offers considerable advantages, such as ready availability, low capital cost, very high intrinsic spatial resolution, but balanced against these advantages are some serious disadvantages, principally the very long exposure times—days, weeks or even months—required to produce a developable image. The long exposure times are a direct result of the very low activity typically present per image feature (an image feature being, for example, a discrete band in a DNA sequence). Further disadvantages associated with the use of film are the non-linear response and limited dynamic range associated therewith, and also the fact that post-processing (e.g. microdensitometry) is required in order to produce quantitative data on radioisotope uptake.

In order to alleviate the aforementioned disadvantages, a number of electronic position sensitive detectors have been employed in place of X-ray film. These techniques are:
  i) Multiwire and other forms of gas proportional counters;
  ii) Photoelectric image intensifiers, for instance comprising a scintillator layer, fibre optic faceplate, S20 optical photocathode and microchannel plate gain stage;
  iii) Photostimulable phosphors or "Image Plates";
  iv) Fibre-optic coupled cooled CCDs.

However, each of these techniques suffers from significant drawbacks. Techniques i)–iii) have large associated capital costs. Gas counters offer spatial resolutions of the order of 1 mm and are virtually unable to detect tritium ($^3$H) since the low energy $^3$H betas (endpoint energy 18.6 KeV) cannot penetrate the counter window. Tritium detection by image intensifier, image plates and CCD arrangements is generally inefficient because of the small optical signal developed in the input layer. Often a fibre-optic demagnifying taper or lens is required to reduce the desired working field approximately (100 cm$^2$ area) to the very much smaller active area of the output sensor resulting in further loss of signal. The optical transmission of a 5:1 taper is at most a few percent.

The present invention overcomes the abovementioned problems by employing a low noise microchannel plate detector to perform autoradiography.

According to a first aspect of the invention there is provided a detector for autoradiography, the detector comprising a substantially radioisotope free microchannel plate (MCP) detector, the dimensions of the active area of said detector being substantially comparable with, or greater than, the working field of the autoradiography sample, and MCP signal collection means.

The dark count of the MCP detector may be less than 0.15 counts.cm$^{-2}$.s$^{-1}$.

The MCP detector may comprise potassium and rubidium free glass.

The MCP detector body parts may comprise PCTFE.

The MCP detector may be shielded against background gamma rays.

The detector may further comprise a resistive anode readout element.

The front plate of the MCP detector may be held at, or substantially at, ground potential.

The detector may measure beta particles emitted by tritium.

According to a second aspect of the invention there is provided a method for performing autoradiography comprising the steps of:
  providing an autoradiography sample; and
  measuring beta particles emitted by radioisotopes within said sample with a substantially radioisotope free MCP detector, the dimensions of the active area of said detector being substantially comparable with, or greater than, the working field of the autoradiography sample, and MCP signal collection means.

Methods and apparatus for performing autoradiography will now described with reference to the accompanying drawings, in which.

Figure 6:
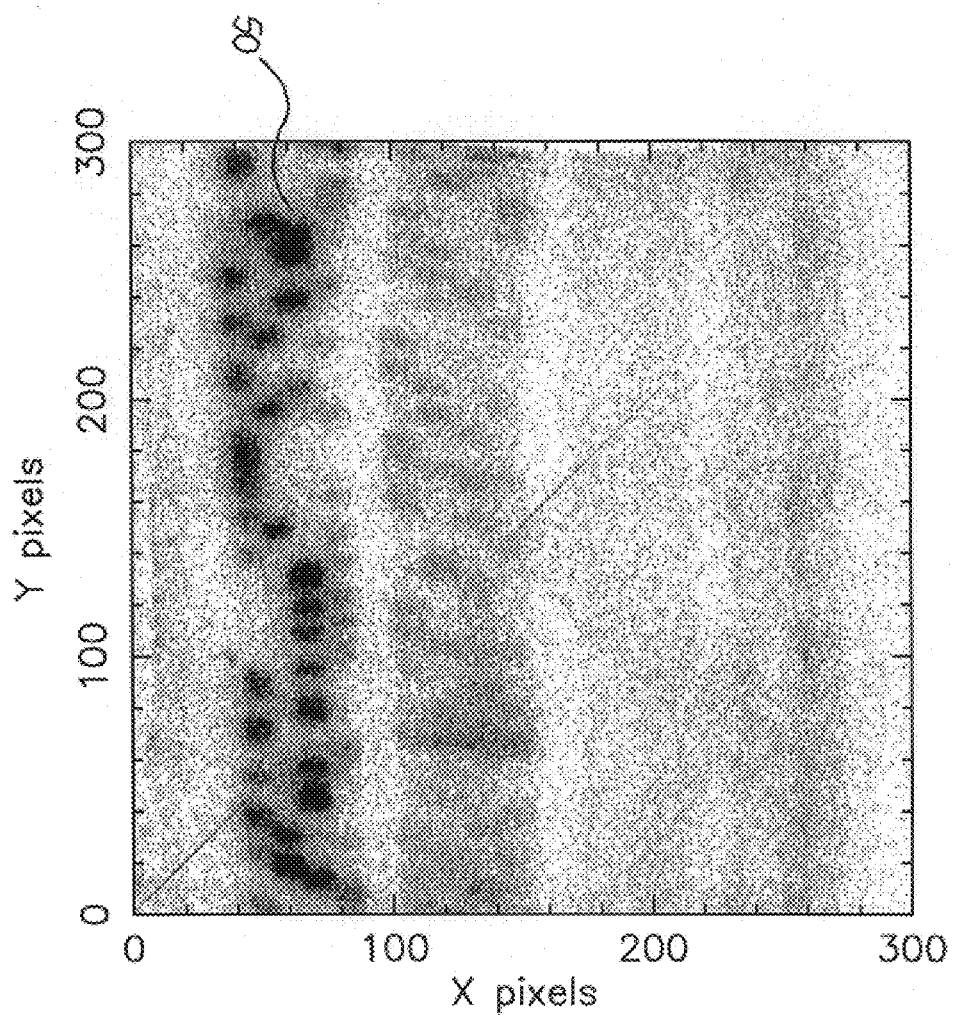
Figure 7:
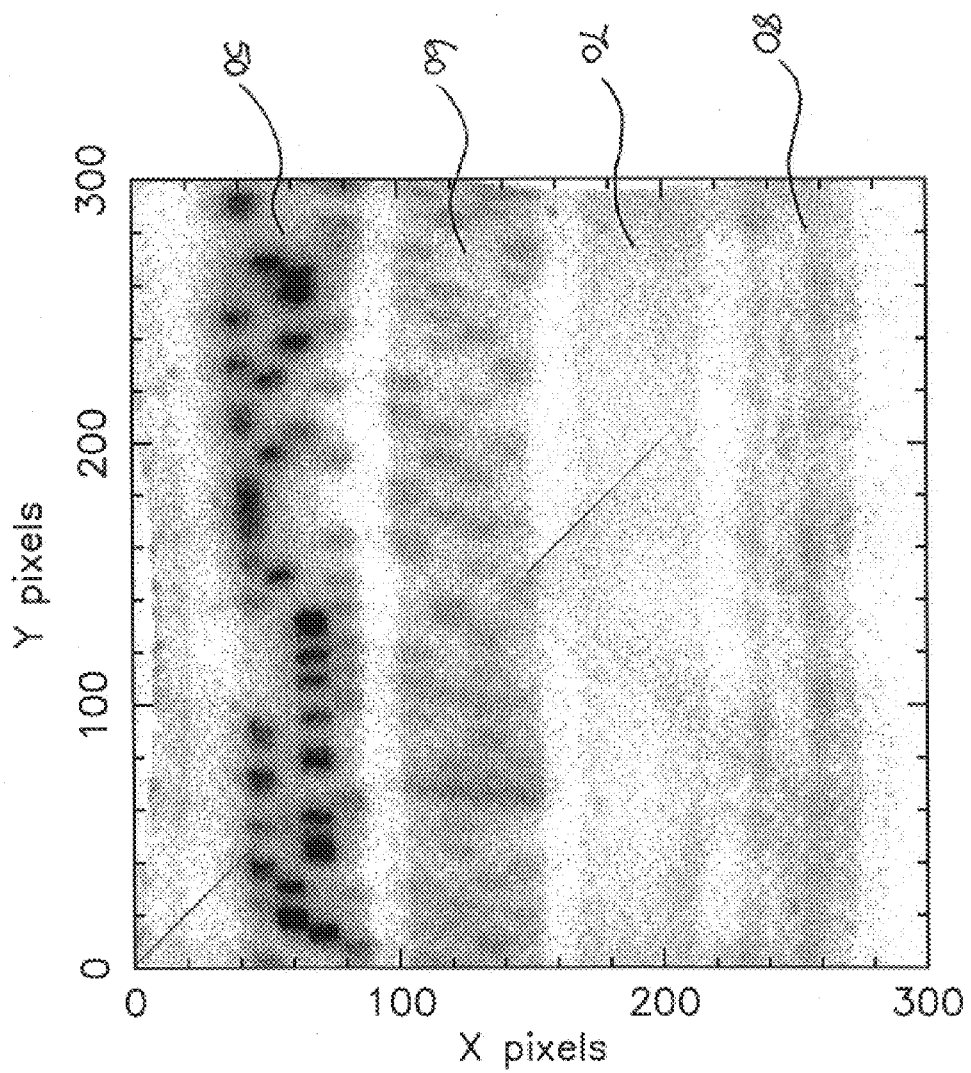
Figure 8:
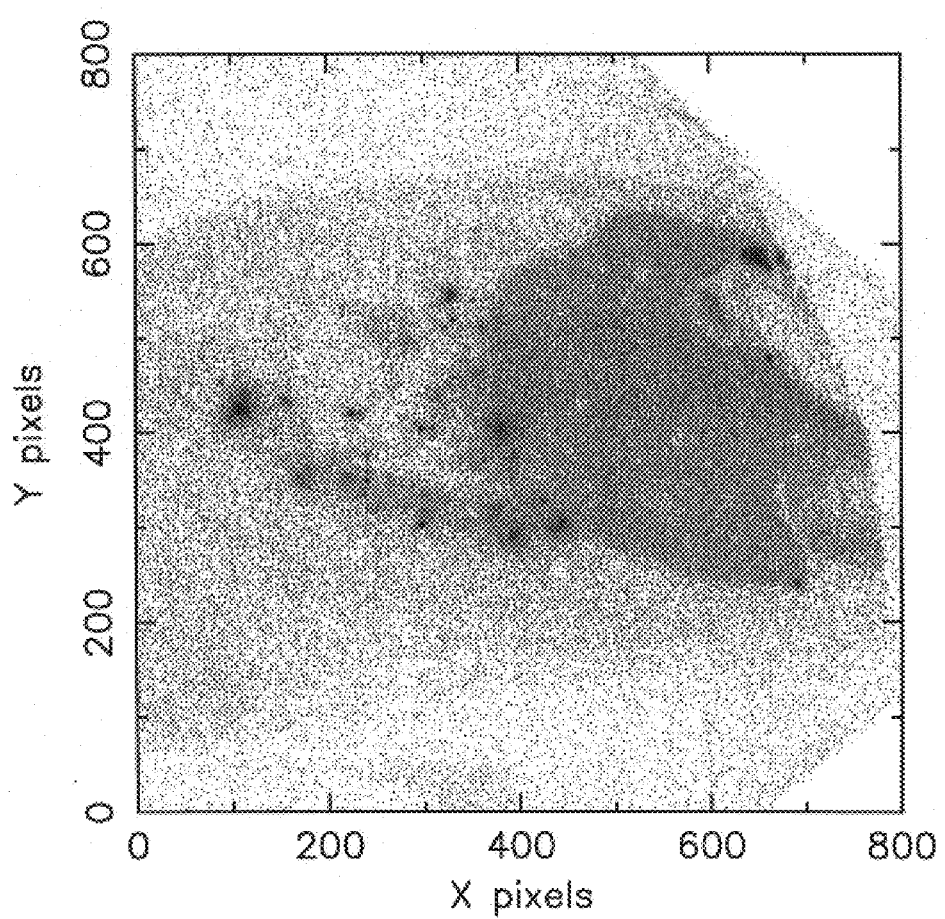

FIGS. 5(a)–5(d) shows $^{35}$S autoradiograms at a variety of exposure times;

FIG. 6 shows the $^{35}$S autoradiogram after an exposure time of 8000 S;

FIG. 7 shows the $^{35}$S autoradiogram after an exposure of approximately 16 hours; and FIG. 8 shows a $^{14}$C autoradiogram of a rat whole-body tissue slice.

Figure 9:
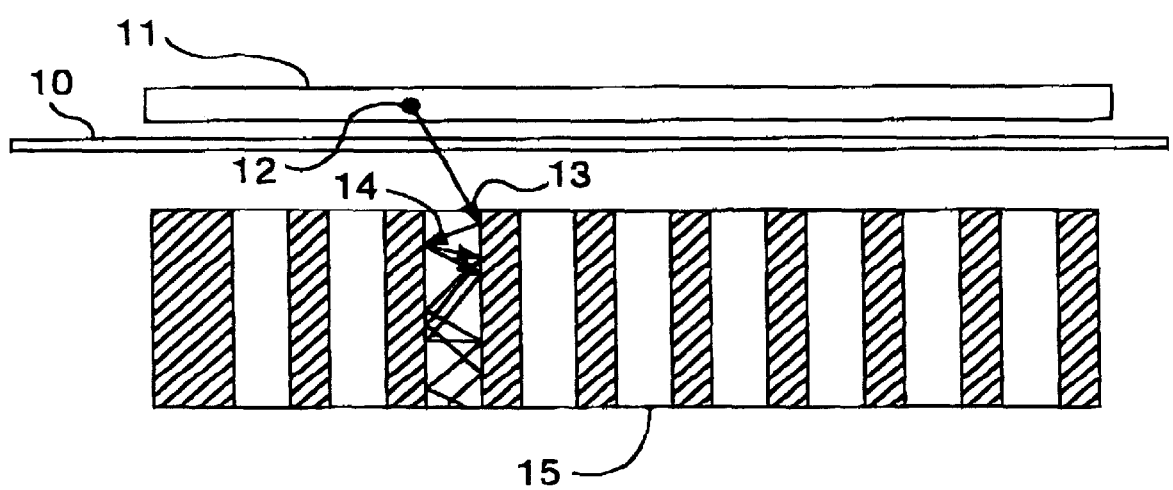

FIG. 9 shows a typical mounting arrangement for mounting the microchannel plate used in the system of the invention; and is also a simplified view of the radionuclide detection which occurs in the system of the invention.

The invention comprises a detector for autoradiography, the detector comprising a substantially radioisotope free MCP detector, the dimensions of the active area of said detector being substantially comparable with, or greater than, the working field of the autoradiography sample, and MCP signal collection means. In the example described below two pairs of chevron MCP detectors were employed as MCP detectors. One pair of MCPs had a large active area of 93 mm×93 mm, whilst the other pair had a smaller active area (30 mm diameter). MCP characteristics are detailed in Table 1.

The detectors employ two low noise glass MCPs (Philips Photonics, Brive la Gaillarde Cedex, France) producing a dark count of less than 0.15 counts cm$^{-2}$s$^{-1}$. The glass is potassium and rubidium free: in fact, the main source of detector background signal in "standard" lead silicate glass MCPs is due to the $^{40}$K β emission of constituent potassium. All detector body parts are manufactured from PCTFE (Poly-chloro tetra fluoro ethylene, Fluorocarbon Company Ltd, Hertford, United Kingdom), since conventional materials, such as Macor, contain potassium. Dark noise rates for both of the detectors employed were 0.12 counts.cm$^{-2}$ s$^{-1}$ above a discriminator level of 0.05× peak detector gain. Such low dark count rates are important given the inherently low signal levels associated with autoradiography samples. The dark count level may be reduced still further by passive lead shielding of the detector against the 1.5 MeV $^{40}$K gamma radiation which constitutes the bulk of the residual background. This radiation emanates from the concrete of the laboratory walls and floors.

A resistive anode readout element was employed at the chevron output as MCP signal collection means (see, for example, G W Fraser, M A Barstow and J F Pearson, Nucl. Instr. Meth., A273 (1988) 667).

The use of low noise MCP detectors whose active areas are comparable to the working field of the sample permits the detector to be placed very close to, or actually directly onto, the sample. This provides inter alia a full image, good sensitivity and high spatial resolution.

The mounting of the sample with respect to the microchannel plate can be by simple proximity and can be explained with reference to the accompanying drawing, FIG. 9.

EXAMPLE 1
TRITIUM STANDARD

Figure 1:
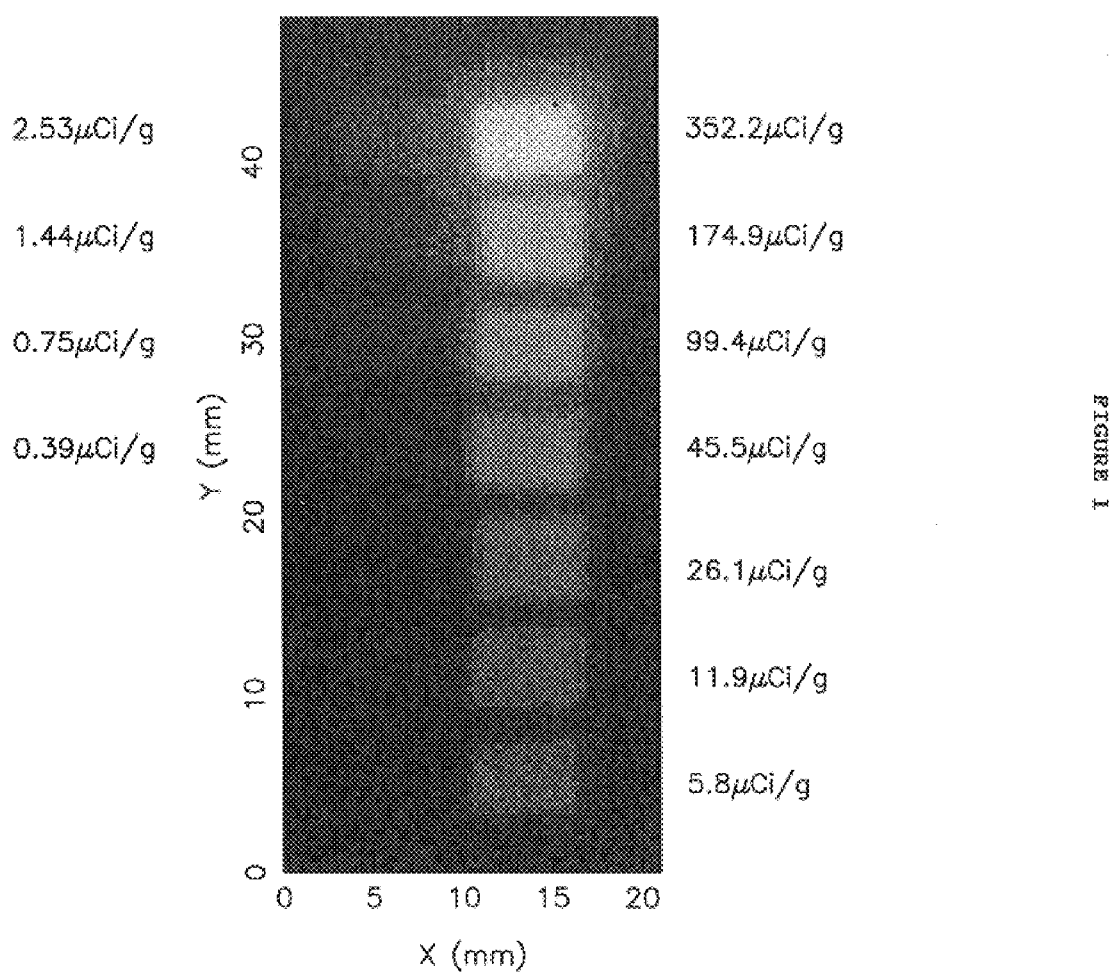
FIG. 1 shows a $^3$H autoradiogram of a tritium standard.

A tritium standard source (American Radiolabeled Chemicals Inc., St Louis, USA) was mounted 0.5 mm from the 93 mm×93 mm active area detector. The detector and the standard were then placed under vacuum ($<10^{-6}$ mbar operating pressure). FIG. 1 shows the resulting $^3$H autoradiogram, accumulated over 20 hours. The standard has fourteen 7×5 mm$^2$ tritium loaded wax "cells" of logarithmically decreasing activities (quoted as 466.5–0.0 $\mu$Ci g$^{-1}$) present in "two lanes" of seven cells. Eleven cells are visible above the background in FIG. 1. Two points to be noted are that the cell activities displayed in FIG. 1 have been corrected for the age of the standard, and that image intensities are displayed on a $\log_{10}$ scale. The corrected activity of the least intense cell to be detected is 0.39 $\mu$Ci g$^{-1}$, and therefore the sensitivity of the large area MCP detector to $^3$H is at least 0.39 $\mu$Ci g$^{-1}$ in 20 hours.

In this example—and indeed in the other examples as described herein—a negative potential of approximately 4.5 kV is applied to the front plate (with the readout element at ground). Such a large negative potential will repel a large fraction of the low energy $^3$H betas. Calculations suggest that a factor of two increase in beta count rate would result if the detector were operated with the front plate at zero potential and the readout element at high positive potential.

The spatial resolution was estimated, from the edge response function of the most intense cell, to be 400 $\mu$m FWHM at the 0.5 mm standard-MCP separation. However, the intrinsic resolution of the large area detector, previously determined from X-ray measurements, is approximately 80 $\mu$m. The spatial resolution of detectors which employ resistive anode readout scales inversely with resistive anode side length. Therefore, it is possible to improve spatial resolution for $^3$H beta detection by (a) reducing the size of the detector and hence the size of the resistive anode required, and (b) operating at reduced sample-detector separations.

The size of the detector required for a given application is, of course, dependent on the size of the sample. This is because it is necessary that, if a full sample image is to be obtained, the dimensions of the active area of the detector are at least substantially comparable with the working field of the sample. Therefore,. smaller samples permit the use of smaller detectors (see Example 2). Operating at reduced sample-detector separations will also have the effect of increasing signal levels. In fact, elimination of the (beta velocity retarding) negative input potential would also serve to improve spatial resolution.

Figure 2:
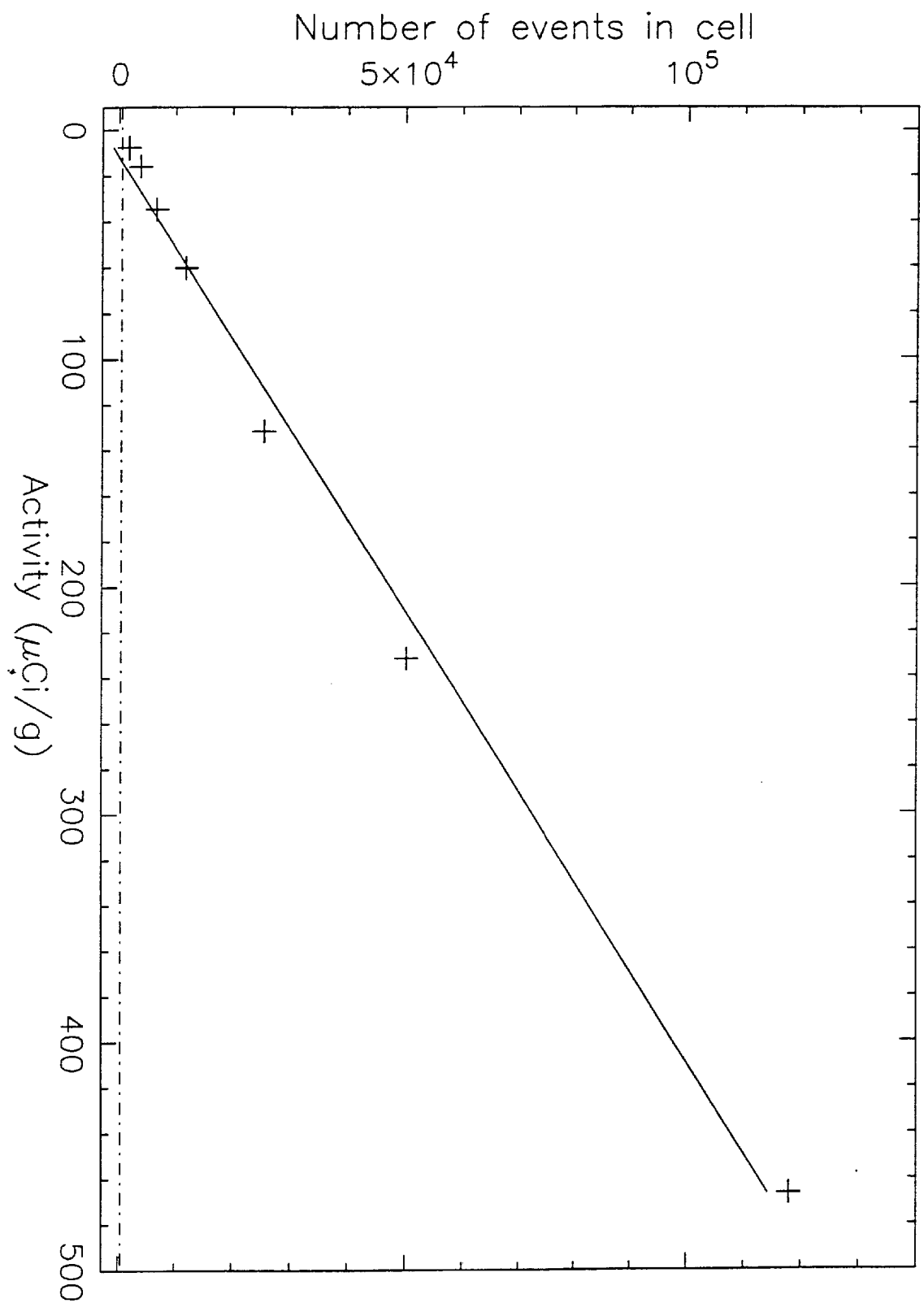
FIG. 2 shows a graph of detection response against tritium cell activity.

FIG. 2 shows the linearity of the detector response derived from the intensities of the images of the tritium standard cells. The maximum count rate of the brightest cell corresponds to a count rate per channel of just $7.4\times10^{-5}$.s$^{-1}$. The clear implication is that the response linearity demonstrated in FIG. 2 to hold over three orders of magnitude in fact extends to six orders of dynamic range.

EXAMPLE 2
$^3$H LABELLED BIOLOGICAL SAMPLES $^3$H labelled biological samples were imaged. The samples were rat lung slices which had been labelled with tritiated Putrescine (1,4-diaminobutane). Semi thin tissue sections (1 $\mu$m thick) were embedded, after preprocessing, in Araldite (RTM) as per preparation for conventional contact emulsion autoradiography. The smaller MCP detector (active area 30 mm diameter) was employed in order to substantially match with the rat time sample size whilst improving spatial resolution. The sample was mounted onto a glass cover slip and then placed in direct contact with the MCP input surface.

Figure 3:
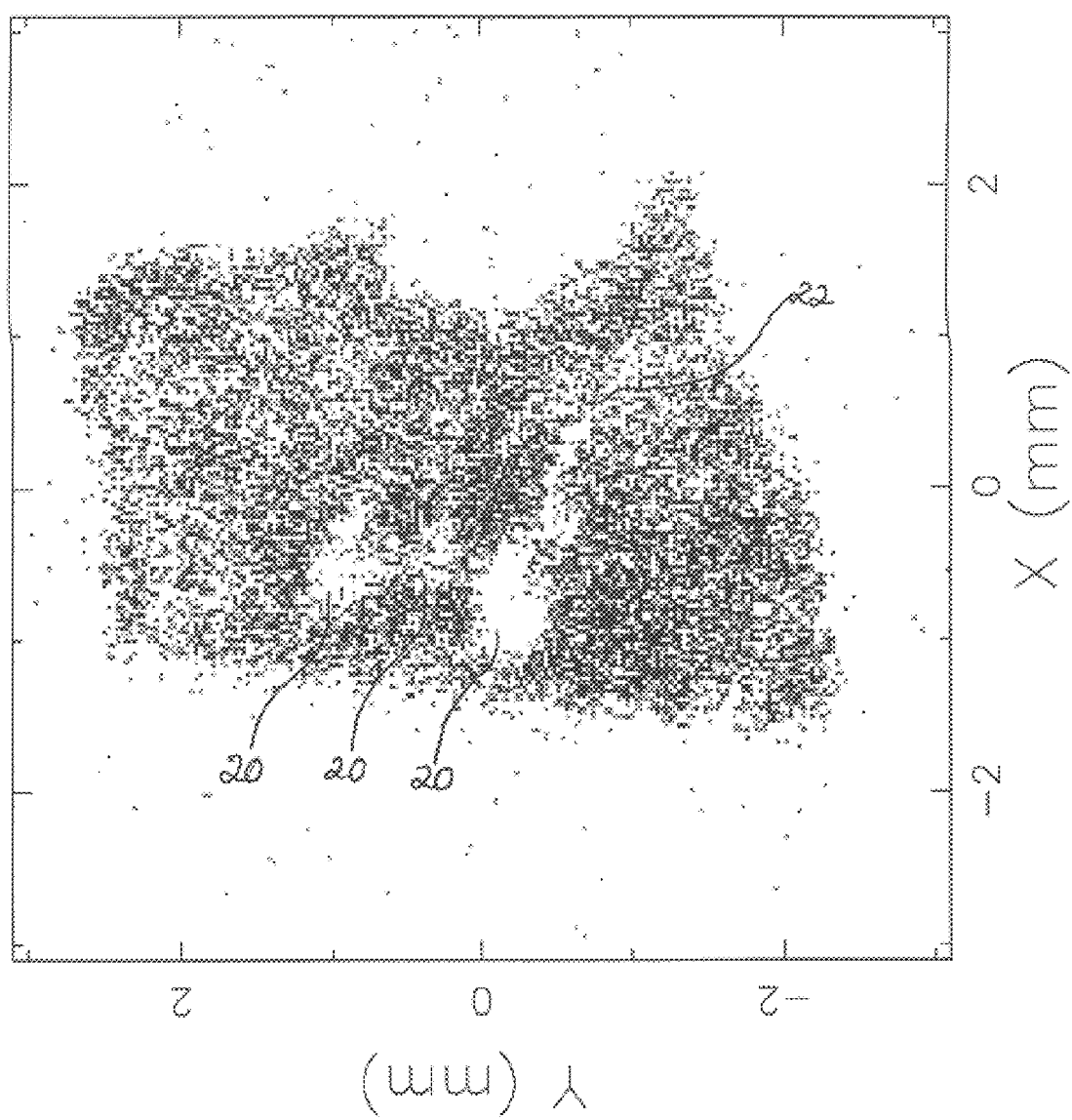
FIG. 3 shows a $^3$H autoradiogram of rat lung tissue.
Figure 4:
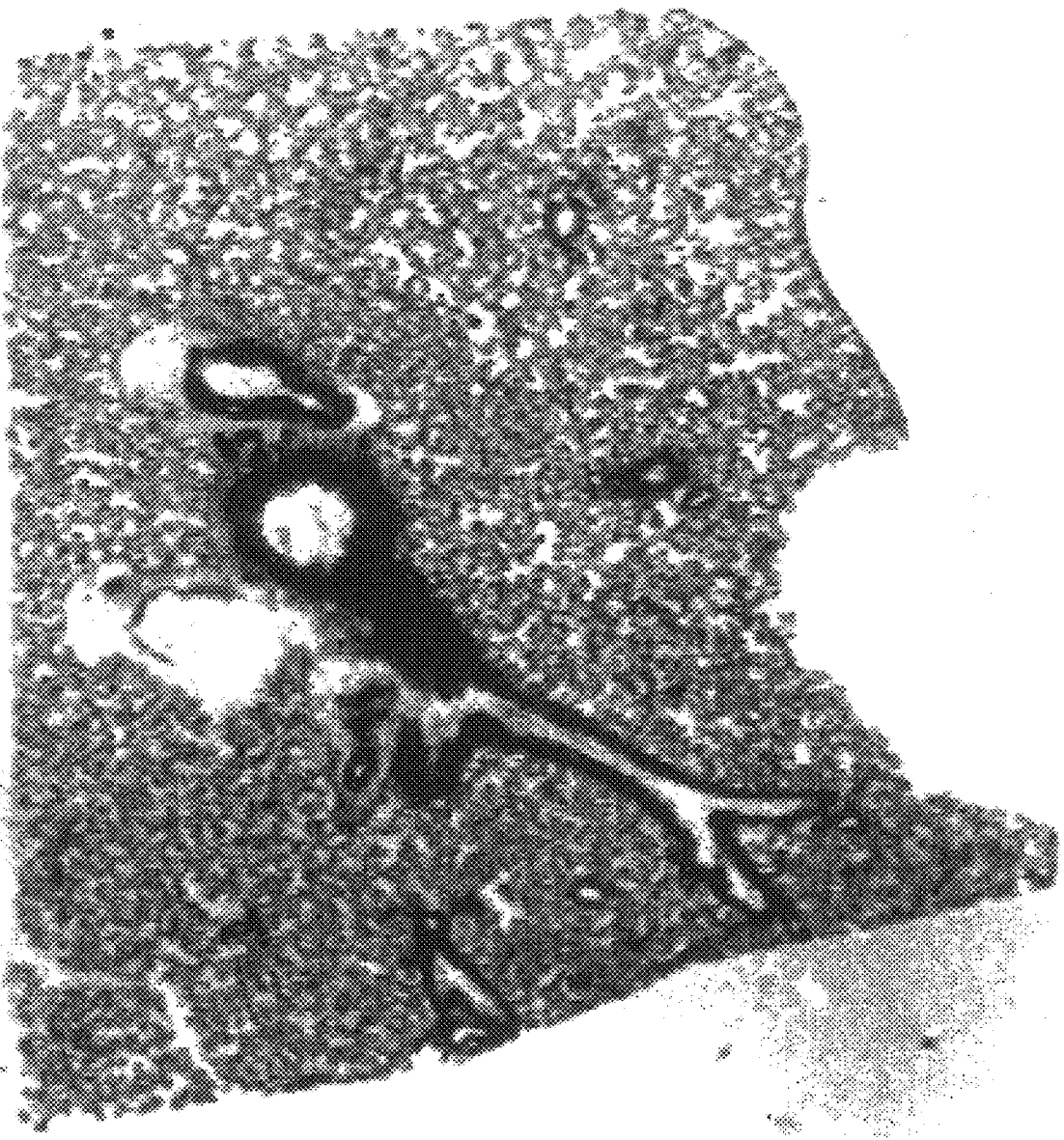
FIG. 4 is an optical light photograph of rat lung tissue.
Figure 5A:
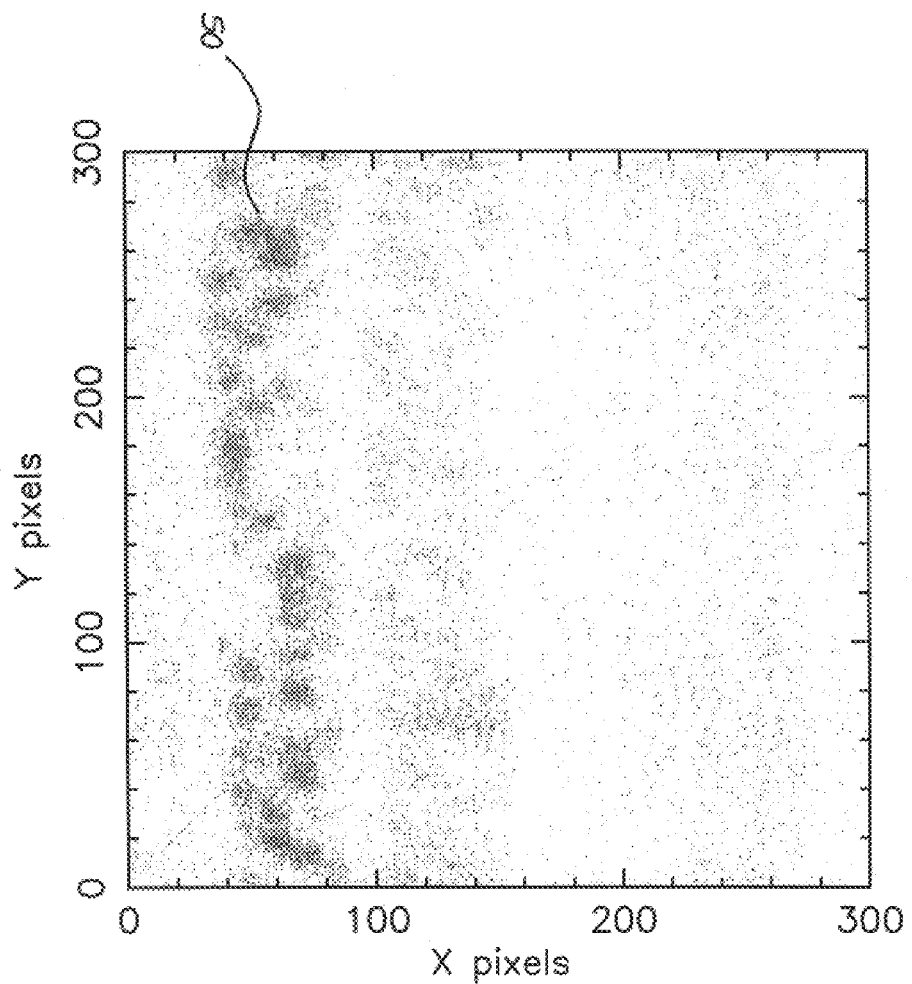
Figure 5B:
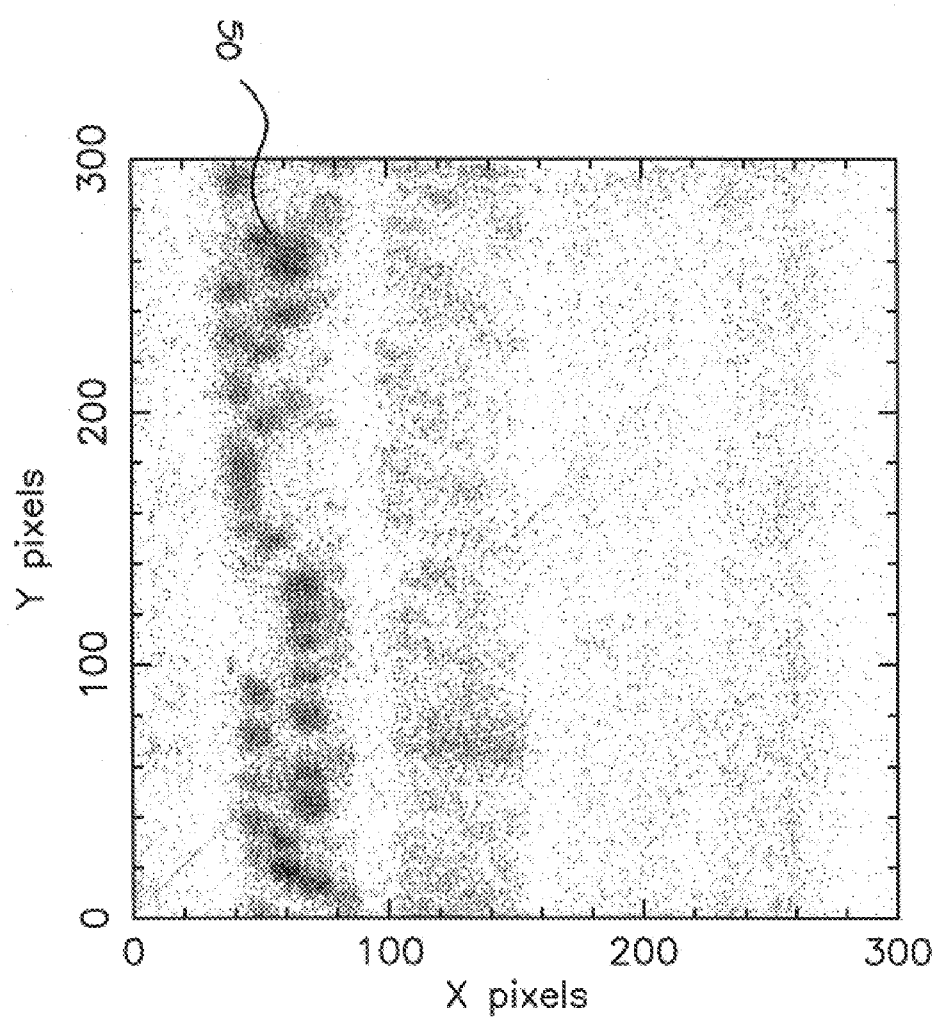
Figure 5C:
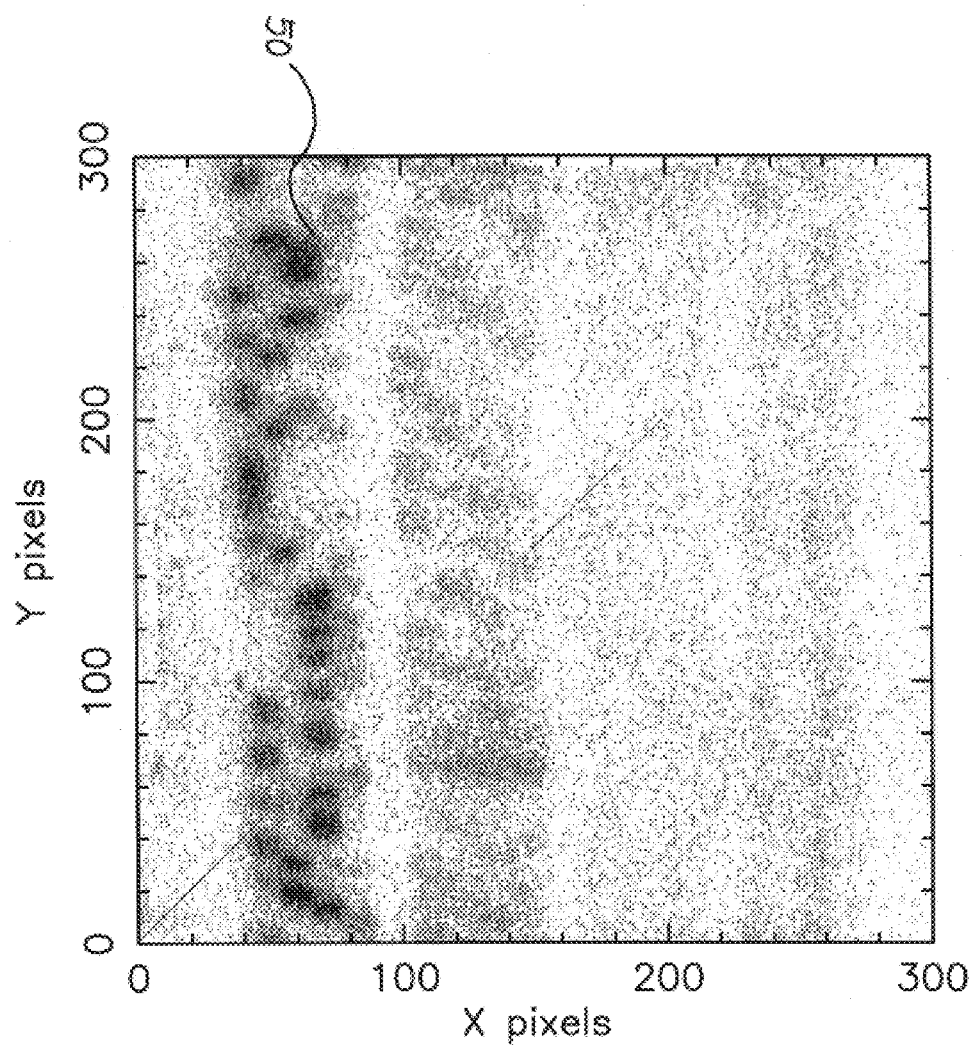
Figure 5D:
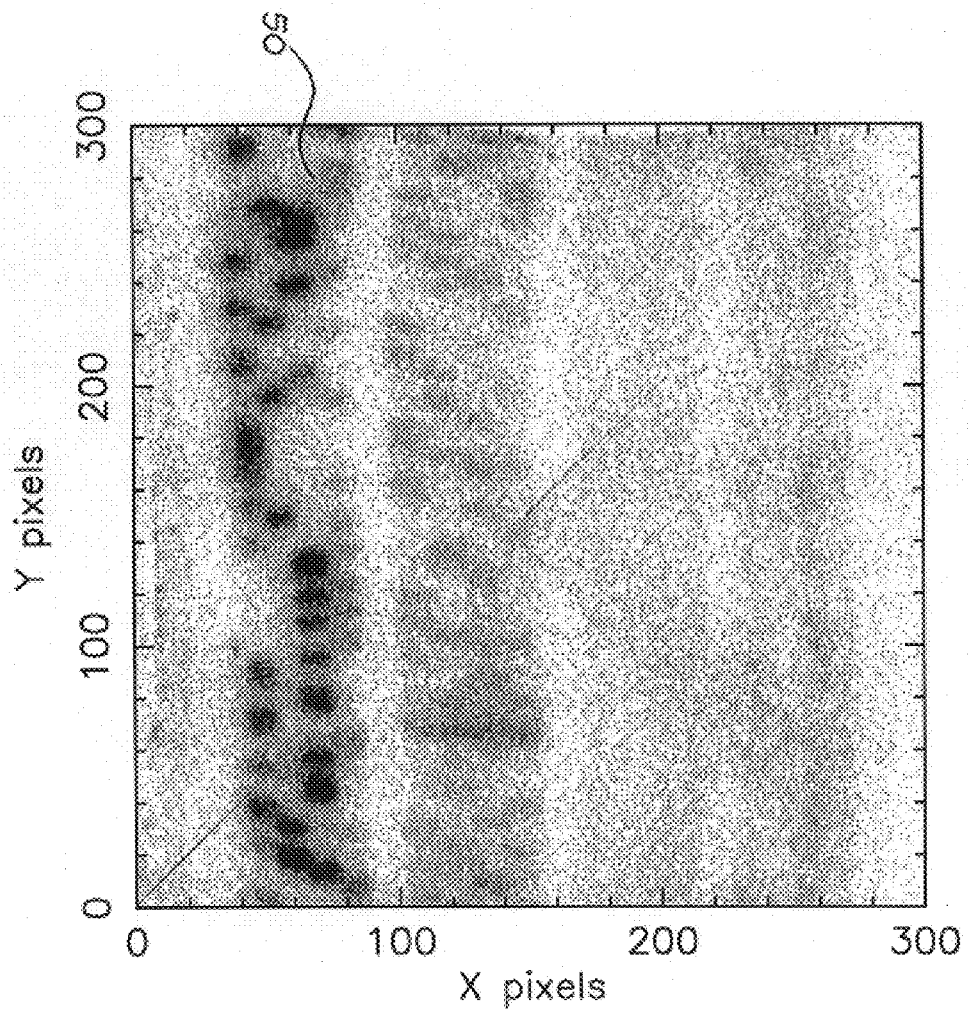

FIG. 3 shows the resulting image from the lung tissue slice, after an accumulation period of 76 hours. For comparison FIG. 4 shows an optical photograph of the sample, obtained using a binocular microscope. In both FIGS. 3 and 4 air passages 20, 22, both perpendicular 20 and in the plane 22 of the sample, are clearly visible. There is no tritium uptake in these regions.

An upper limit to the image resolution is estimated as 100 $\mu$m—a more accurate measurement was not possible since the edge of the sample, from optical microscope inspection, is only very approximately straight. However, the improvement over the spatial resolution of the image of Example 1 confirms the expectation that reduced detector dimensions and reduced sample-detector separations would lead to an enhancement in image resolution.

The activity of the tissue sample was unknown, but from the known MCP beta detection efficiency (50%) the measured noise subtracted MCP count rate (0.059 counts s$^{-1}$), the sample thickness (1 $\mu$m) and an assumed sample density of 1 g cm$^{3\ 3}$ an estimated activity of approximately 0.52 $\mu$Ci g$^{-1}$ is obtained.

EXAMPLE 3
$^{35}$S DETECTION $^{35}$S beta autoradiograms were recorded with the large active area MCP detector. The autoradiograms are of a sample produced by gel electrophoresis of slime mould DNA. The gel was dried and, for comparison purposes, was first placed in contact with conventional X-ray film in a 36 hour exposure. The gel was then mounted in vacuum in intimate contact with the front face of the input channel plate of the chevron pair and the $^{35}$S beta image recorded, over a total period of 16 hours In FIGS. 5 to 7 are presented the 35S beta autoradiograms, recorded at a variety of exposure times with the MCP detector. In all cases the image size is 93×93 mm$^2$. It should be noted that: i) FIGS. 5 to 7 are in good agreement with the results of the X-ray film experiment; ii) the MCP images are in a digital form which has been image processed—in fact, the raw 2048×2048 file had to be binned to 512×512 for display of the full field, with a consequent loss of resolution; iii) the faint diagonal line on all of FIGS. 5 to 7 is an ADC artefact; and iv) the 'pin cushion' distortion apparent at two of the sides of the images can easily be removed by further software processing. FIGS. 5a, 5b, 5c and 5d show the MCP image after exposure times of 1000, 2000, 4000 and 8000 seconds, respectively. The 8000s image is also shown, on a larger scale, in FIG. 6, whilst FIG. 7 shows the final image after an exposure time of approximately 57600 s (16 hours). The beta pattern 50 corresponding to the most active of the four gel "lanes" is apparent after a mere 1000 s, and clearly readable after only 8000 s (2.2 hours). The full image of FIG. 7 displays a very large dynamic range between pattern 50 and the other patterns 60, 70, 80. The undulation of the patterns 50–80 is real, and is confirmed by the film contact print.

EXAMPLE 4
$^{14}$C LABELLED BIOLOGICAL SAMPLES

A further demonstration is provided by FIG. 8, which shows a $^{14}$C autoradiogram (end-point energy 156 KeV)

generated by MCP detection of a sample of $^{14}C$ labelled rat tissue after an exposure time of 105 minutes.

MCP detection offers high spatial resolution—certainly compared to gas counter systems. For example, the spatial resolution obtained with the present invention, 100 μm or less, compares to a "best" spatial resolution of approximately 500 μm obtained with the optical avalanche chamber type gas proportional counter. Image plates can be used for imaging tritium, but require special plates. A typical quoted minimum detectable activity for $^3H$ is 1.67 Bq $mm^{-2}$ $hr^{-1}$, which is a factor of 80 poorer than the present invention. The large dimensions of the MCP detector (in relation to the size of the sample) result in a field of view greater than that of current fibre-optic coupled CCD systems, whilst the overall detection efficiency of the (single stage) MCP detection process is certainly much higher. If the activity of a single image element is R, then the MCP signal count rate from that element will be approximately R/4 (Babenkov et al, Nucl. Instr. Meth., A252 (1986) 83) within a factor of approximately 2 of the ideal. Furthermore the nature of the MCP output is suited for digitisation and storage/processing on computer. The electron detection efficiency of the windowless 12.5 μm pore plates, as measured by Babenkov et al, is likely to be in excess of 50% not only for $^3H$ beta radiation (end-point energy 18.6 KeV) but also for $^{32}p$ (end-point energy 1.7077 MeV) and $^{35}S$ (end-point energy 168 KeV, average energy 48.8 KeV) beta radiation. Detection of $^{35}S$ and $^{32}P$ betas is important for electrophoresis gel applications, whilst the detection of tritium betas is of particular importance since it permits autoradiography of tissue slices.

TABLE 1

MCP parameters

| Parameter | Value |
|---|---|
| Thickness (L) | 1.5 mm |
| Channel diameter (D) | 12.5 μm |
| Channel pitch | 15.0 μm |
| L:D | 120:1 |
| Channel bias angle | 6° |

What is claimed is:

1. An autoradiography system, comprising:
an autoradiography sample;
a substantially radioisotope free microchannel plate (MCP) detector having an active area, the dimensions of the active area of said detector being substantially comparable with, or greater than, the working field of the autoradiography sample;
MCP signal collection means; and
wherein the MCP detector directly measures beta particles emitted by radioisotopes within the autoradiography sample.

2. An autoradiography system according to claim 1, in which the MCP detector has a characteristic dark count, the dark count of the MCP detector being less than 0.15 counts.$cm^{-2}.s^{-1}$.

3. An autoradiography system according to claim 1, in which the MCP detector comprises potassium and rubidium free glass.

4. An autoradiography system according to claim 1, in which the MCP detector is comprised of body parts, the body parts being formed of poly-chloro tetra fluoroethylene.

5. An autoradiography system according to claim 1, in which the MCP detector is shielded against background gamma rays.

6. An autoradiography system according to claim 1, in which the MCP signal collection means comprises a resistive anode readout element.

7. An autoradiography system according to claim 1, in which the MCP detector has a front plate, the front plate being held at, or substantially at, ground potential.

8. An autoradiography system according to claim 1, in which beta particles emitted by tritium are detected.

9. The autoradiography system of claim 1, wherein the MCP detector is placed very close to, or in actual contact with, the autoradiography sample.

10. A method for performing autoradiography comprising the steps of:
providing an autoradiography sample;
directly measuring beta particles emitted by radioisotopes within said sample with a substantially radioisotope free MCP detector having an active area, the dimensions of the active area of said detector being substantially comparable with, or greater than, the working field of the sample, and MCP signal collection means.

11. The method of claim 10, in which the MCP detector has a characteristic dark count, the dark count of the MCP detector being less than 0.15 counts.$cm^{-2}.s^{-1}$.

12. The method of claim 10, in which the MCP detector comprises potassium and rubidium free glass.

13. The method of claim 10, in which the MCP detector is comprised of body parts, the body parts being formed of poly-chloro tetra fluoroethylene.

14. The method of claim 10, in which the MCP detector is shielded against background gamma rays.

15. The method of claim 10, in which the MCP signal collection means comprises a resistive anode readout element.

16. The method of claim 10, in which the MCP detector has a front plate, the front plate being held at, or substantially at, ground potential.

17. The method of claim 10, in which beta particles emitted by tritium are detected.

18. The method system of claims 10, wherein the MCP detector is placed very close to, or in actual contact with, the autoradiography sample.

* * * * *